No. 883,072. PATENTED MAR. 24, 1908.
M. ABBOTT.
FARMING IMPLEMENT.
APPLICATION FILED MAR. 29, 1907.
2 SHEETS—SHEET 1.
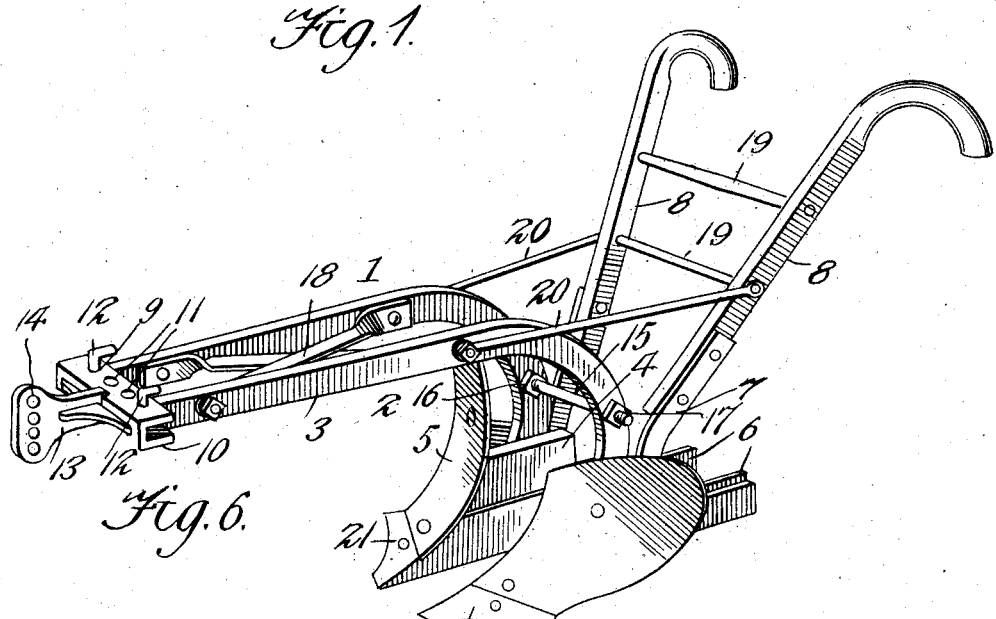
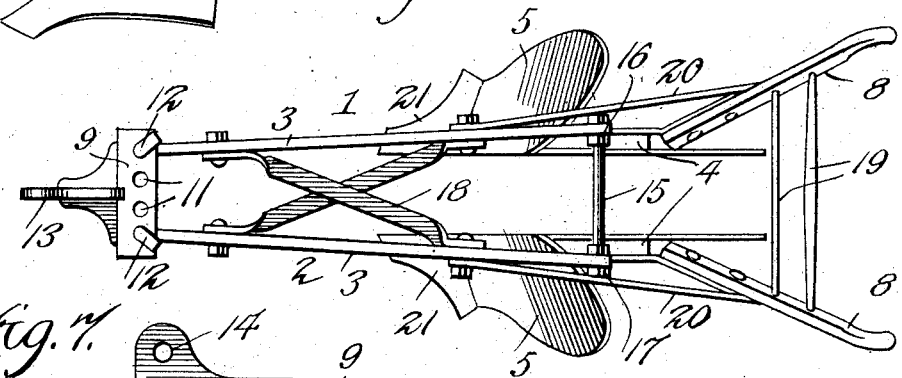
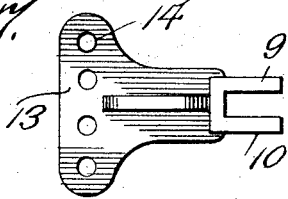
Witnesses
Inventor
Milo Abbott,
By Victor J. Evans
Attorney No. 883,072. PATENTED MAR. 24, 1908.
M. ABBOTT.
FARMING IMPLEMENT.
APPLICATION FILED MAR. 29, 1907.

2 SHEETS—SHEET 2.

Inventor
Milo Abbott

Witnesses
Geo. Ackman
D. W. Gould

By Victor J. Evans
Attorney

THE NORRIS PETERS CO., WASHINGTON, D. C.

UNITED STATES PATENT OFFICE.

MILO ABBOTT, OF BLYTHEVILLE, ARKANSAS.

FARMING IMPLEMENT.

No. 883,072.  Specification of Letters Patent.  Patented March 24, 1908.

Application filed March 29, 1907. Serial No. 365,369.

*To all whom it may concern:*

Be it know that I, MILO ABBOTT, a citizen of the United States, residing at Blytheville, in the county of Mississippi and State of Arkansas, have invented new and useful Improvements in Farming Implements, of which the following is a specification.

The invention relates to an improvement in farming implements and particularly to a ground breaking implement so constructed as to adapt it for use as a lister or as a middle breaker.

The main object of the present invention is the production of a combined lister and middle breaker in which the parts are so arranged as to provide for the securing of the beams in spaced relation and the application of lister points, or to arrange said parts for the reception of a single breaking point, whereby the implement is conveniently adopted for use as a lister or as a middle breaker.

The invention will be described in the following specification, reference being had particularly to the accompanying drawings, in which:—

Figure 5:
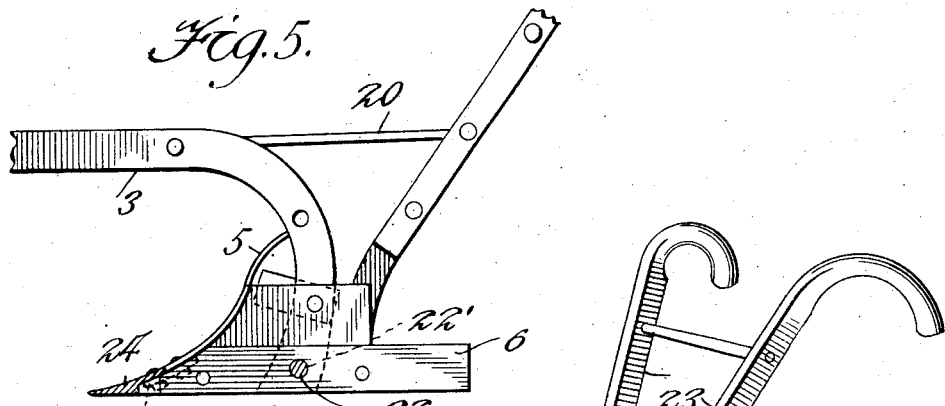
Figure 3:
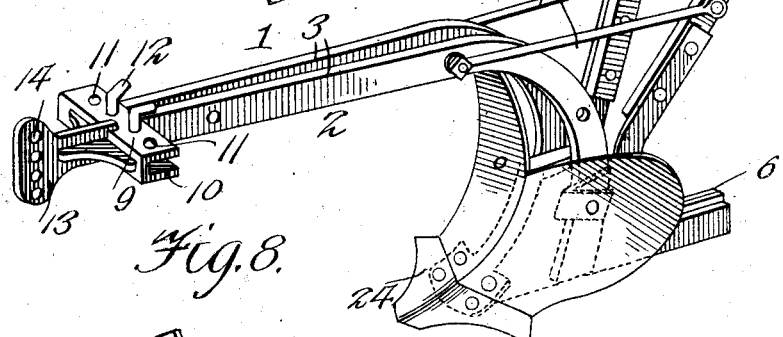
Figure 8:
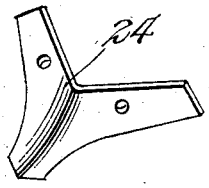
Figure 4:
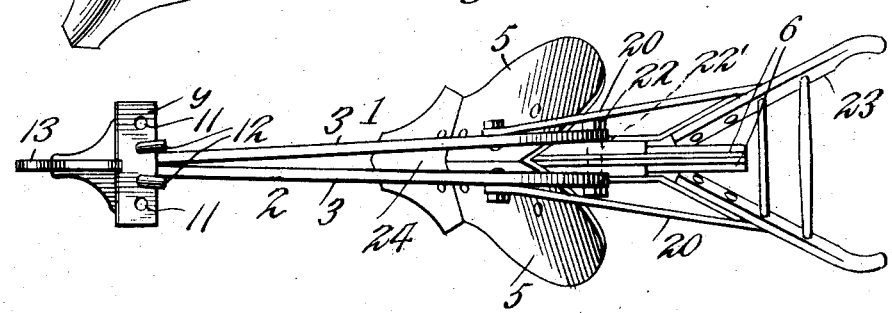

Figure 1 is a perspective view of a ground breaking implement constructed in accordance with my invention, the parts being arranged to provide a lister, Fig. 2 is a plan of the same, Fig. 3 is a perspective of the implement with the parts arranged to provide a middle breaker, Fig. 4 is a plan of the same, Fig. 5 is a vertical central section of the same, parts being broken away, Fig. 6 is a perspective of one of the lister points, Fig. 7 is a plan of the coupling head, Fig. 8 is a perspective of the middle breaker point.

Referring particularly to the drawings, my improved implement comprises in effect two single plow structures 1 and 2, so arranged as to adapt them for reverse work, that is one is a left hand and the other a right hand plow.

Each plow structure comprises a beam 3 of the usual curved form carrying at the lower end a tailboard 4, to the forward side of which is secured the usual moldboard 5, and to the lower edge of which tailboard is secured a landside bar 6. A handle brace or strip 7 extends upwardly and rearwardly from the landside to which the desired handle structure, including members 8, is secured.

The mold-boards are so arranged on the respective beams as to provide right and left hand plows, and in assembling these plows for use as a lister I secure the forward ends of the beams in a coupling block 9 comprising spaced plates 10 designed to receive the ends of the beams between them. The respective plates are formed with alined openings 11, preferably four in number, and the beams 3 are secured in the outermost opening by pins 12 engaging said opening and passing through corresponding holes in the beams. The forward end of the coupling block is provided with the usual clevis block 13 formed at its forward or free end with a series of vertically alined openings 14 for the adjustable reception of the clevis. The beams are supported in spaced relation at their relatively rear ends by a tie bolt 15, carrying nuts 16 against which the beams bear, the end of the bolt beyond the beams being provided with securing nuts 17. Brace strips 18 are secured between the beams adjacent the forward ends of the latter, being preferably crossed to provide the desired bracing action. The respective handles 8 are connected one to each handle brace 7, and spacing rods 19 are inserted between the respective handles to maintain them in desired position. Brace rods 20 extend from the handles to the beams further insuring the stability of the structure. In this arrangement of the parts the respective mold-boards are maintained in spaced relation, and listing points 21 are secured to the frames immediately below the mold-boards, said points being preferably secured to frame strips 21' projecting from the landsides. The lister is thus provided, and is capable of all the uses to which such an implement may be put.

In adapting the implement as a middle breaker, the braces 18 are removed, the tie bolt 15 is disconnected from the beams, and the coupling block detached from the ends of the beams. The beam ends are again connected with the coupling head, though this time in the innermost or relatively adjacent openings, so that the forward ends of the beams are in contact. A second tie bolt 22' is inserted through openings 22 in the landsides, and adjusted until the proximate edges of said sides are in contact. The handles 8 are removed and a second pair of handles 23 secured to the landsides. The listing points 21 are disconnected and a single middle breaker point 24 secured below both the mold boards to the strips 21', the point or apex of breaker 24 being in line with the contacting edges of the mold-boards.

The structure is thus complete for a middle breaker implement and capable of all uses for which such may be designed.

The details of construction herein described illustrate the preferred form, though it is to be understood that I consider as within the spirit of the present invention all such changes and variations as may fall within the scope of the appended claims.

Having thus described the invention what is claimed as new, is:—

A combination breaking implement adapted for use as a lister or middle breaker comprising independent beams, mold-boards carried by the beams and facing in opposite directions and provided with removable points, a pair of handles, one handle connected to each beam, a coupling head for the forward ends of the beams, said coupling head being formed with a transverse channel for slidably receiving the ends of the beams, the upper and lower walls of the channel being formed with a series of alined holes to register with holes formed in the ends of the beams, pins engaging the respectively alined holes to secure the beams in position in the head, the holes in the head being so spaced as to permit the beams and mold-boards to be arranged in contact with each other or in spaced relation, brace members for connecting the spaced beams, and a double cutting point applicable to the mold-boards when the latter are in contact.

In testimony whereof, I affix my signature in presence of two witnesses.

MILO ABBOTT.

Witnesses:
W. A. EDWARDS,
JOHN J. LEDBETTER.